(No Model.)
C. A. CHAPMAN.
CATHETER.
No. 402,902. Patented May 7, 1889.
FIG. I.
FIG. II.
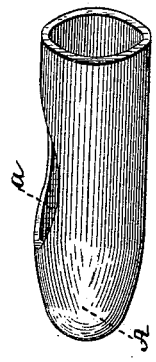
FIG. IV.
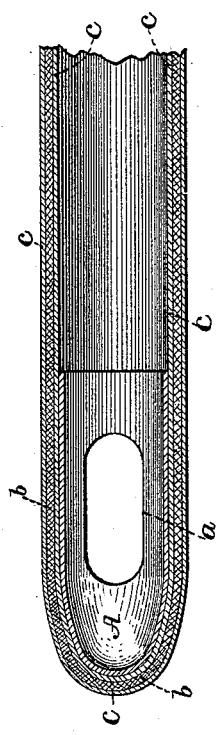
FIG. III.
Attest:
Jas. K. McCathran
S. H. Knight.
Inventor:
Charles Arthur Chapman.
By Knight Bros
attys.

United States Patent Office.

CHARLES ARTHUR CHAPMAN, OF NO. 8 STOCK ORCHARD STREET, CALEDONIAN ROAD, LONDON, COUNTY OF MIDDLESEX, ENGLAND, ASSIGNOR TO SARDY, COLES & CO., OF NEW YORK, N. Y.

CATHETER.

SPECIFICATION forming part of Letters Patent No. 402,902, dated May 7, 1889.

Application filed April 7, 1888. Serial No. 269,971. (No model.) Patented in England September 16, 1887, No. 12,577.

*To all whom it may concern:*

Be it known that I, CHARLES ARTHUR CHAPMAN, a subject of the Queen of Great Britain, and a resident of No. 8 Stock Orchard Street, Caledonian Road, London, N., in the county of Middlesex, England, have invented certain new and useful Improvements in Catheters, of which the following is a specification.

My invention has reference to a type of surgical appliances known as "catheters," and is devised with the view of overcoming a well-known disadvantage and source of danger.

Hitherto catheters have been formed of an elastic gum, which by alternate exposure to moisture and dryness gradually perishes and cracks. In this condition it may happen that while the instrument is being used a part of the end would break away and thus cause a certain amount of danger and risk.

The device according to my invention comprises the attachment or adaptation to the end of an elastic gum catheter of a silver point having an eye formed therein. Said silver protective point having been inserted in the end of the catheter would be covered with a material formed of strong linen thread, preferably that known as "Belfast" linen thread, which is carefully woven, and finally coated with a very elastic gum.

Figure I is a catheter having a rounded end. Fig. II represents a catheter having an elongated tapered end. Fig. III is a sectional view of a catheter drawn to an enlarged scale, and showing the construction thereof. Fig. IV is an enlarged perspective view of the metallic protecting-point.

A is the silver protective point; $a$, the eye. $b$ is the woven Belfast linen thread; and $c$ represents the elastic gum.

It will be seen that a catheter produced as above described has several important advantages over those formed wholly of elastic gum, inasmuch as the silver point being imperishable the risk of cracking and disintegration of the material is obviated, and thus a source of danger is prevented, and, further, the passage of the instrument past the stricture into the bladder is greatly facilitated, allowing of the free flow of water or discharge therefrom.

Having fully described the nature of my invention, what I desire to claim and secure by Letters Patent is—

In combination with a flexible catheter, substantially as hereinbefore described, a rigid former located in the end of the catheter and contiguous to the eye or opening of the same, for the purposes set forth.

In testimony that I claim the foregoing as my invention I affix my signature in presence of two witnesses.

CHARLES ARTHUR CHAPMAN.

Witnesses:
JAMES STEVENSON,
*Gray's Inn Chambers, 20 High Holborn, London, W. C.*
EDGAR GEORGE,
*Assistant to above, 20 High Holborn, London, W. C.*